June 16, 1964
U. P. TRUDEAU
3,137,394
METHOD AND APPARATUS FOR REMOVING AND
TRANSFERRING FINISHED GLASS ARTICLES
Filed April 28, 1961
9 Sheets-Sheet 1
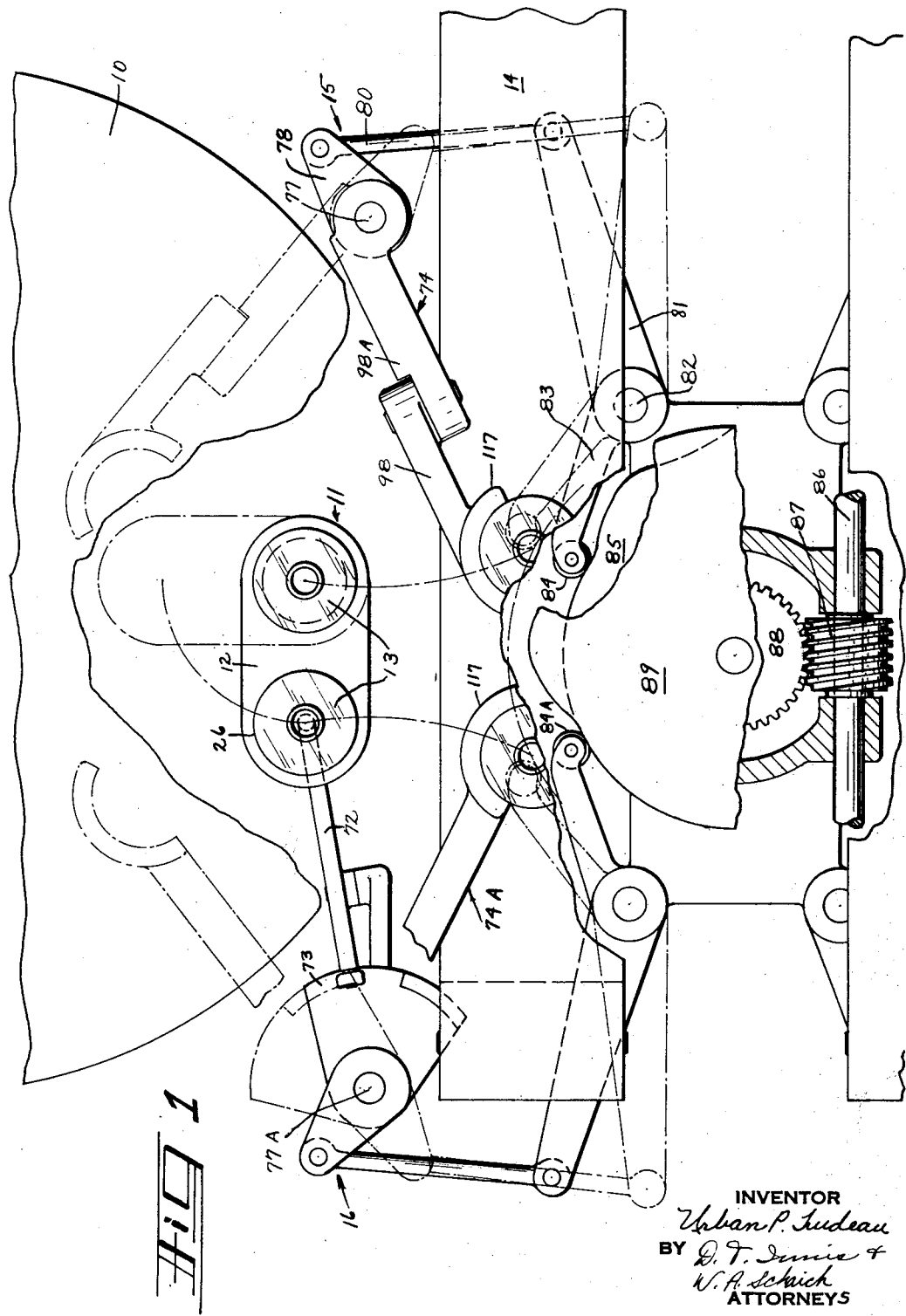
INVENTOR
Urban P. Trudeau
BY
ATTORNEYS

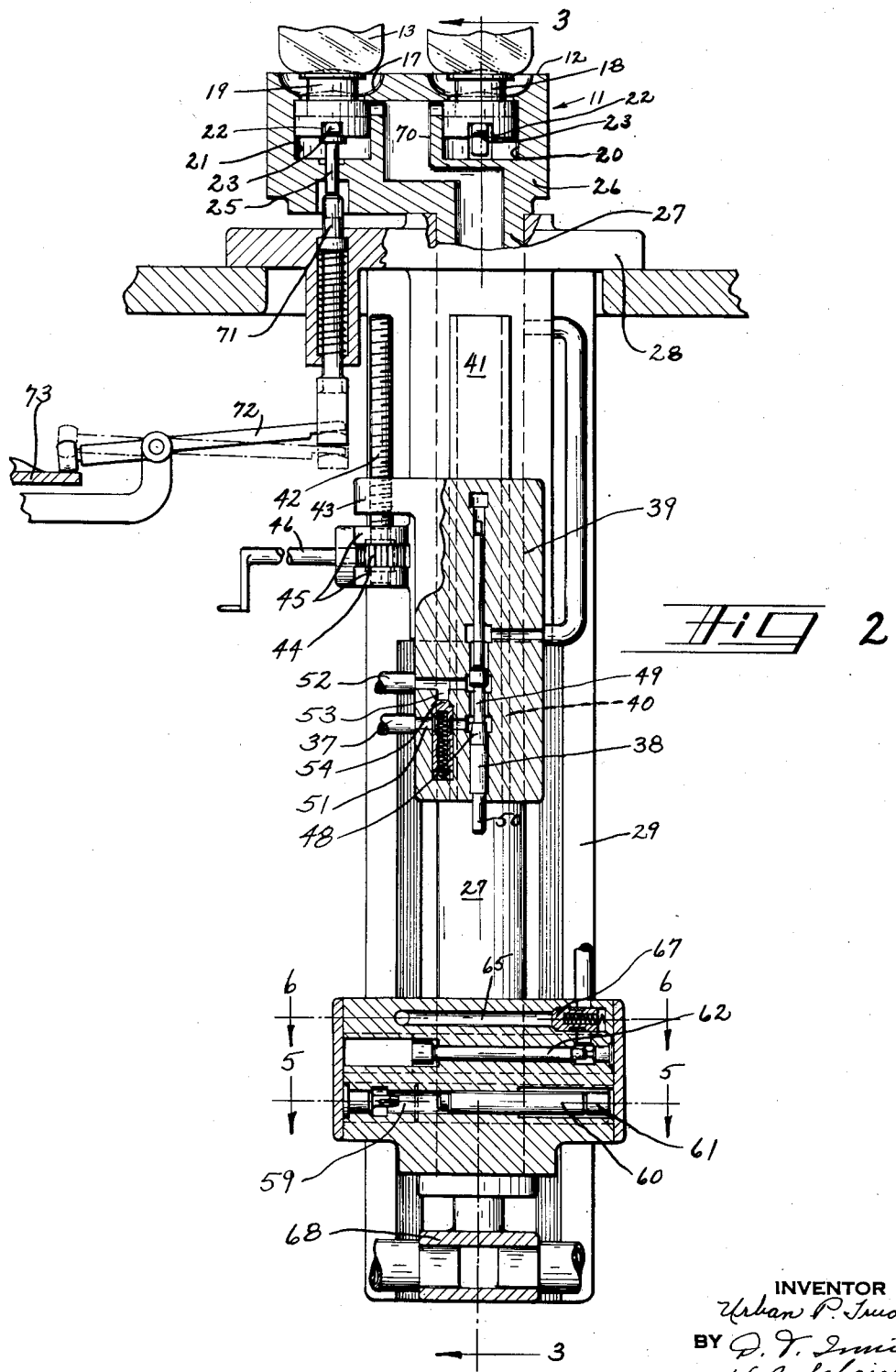

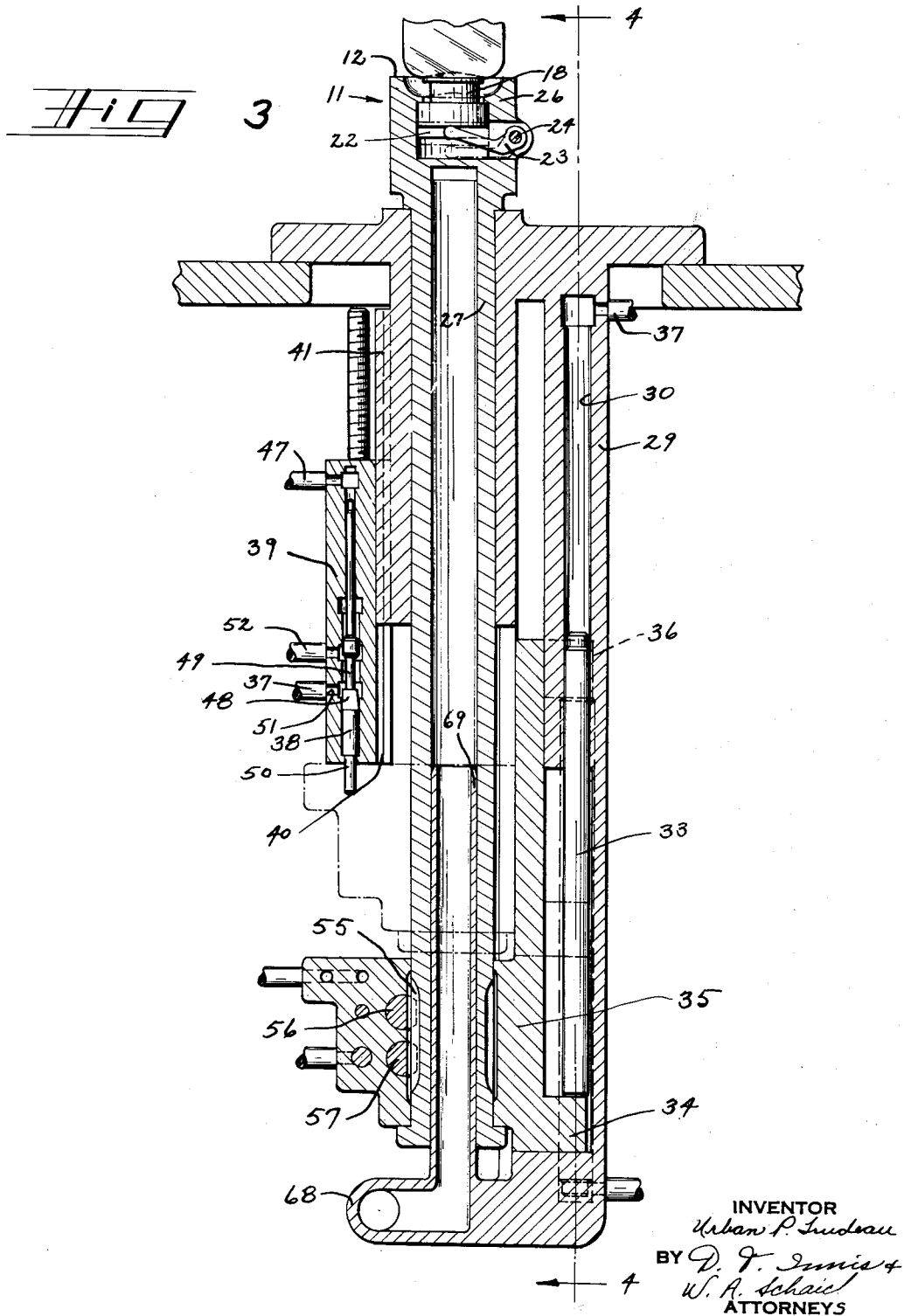

June 16, 1964
U. P. TRUDEAU
3,137,394
METHOD AND APPARATUS FOR REMOVING AND
TRANSFERRING FINISHED GLASS ARTICLES
Filed April 28, 1961
9 Sheets-Sheet 4
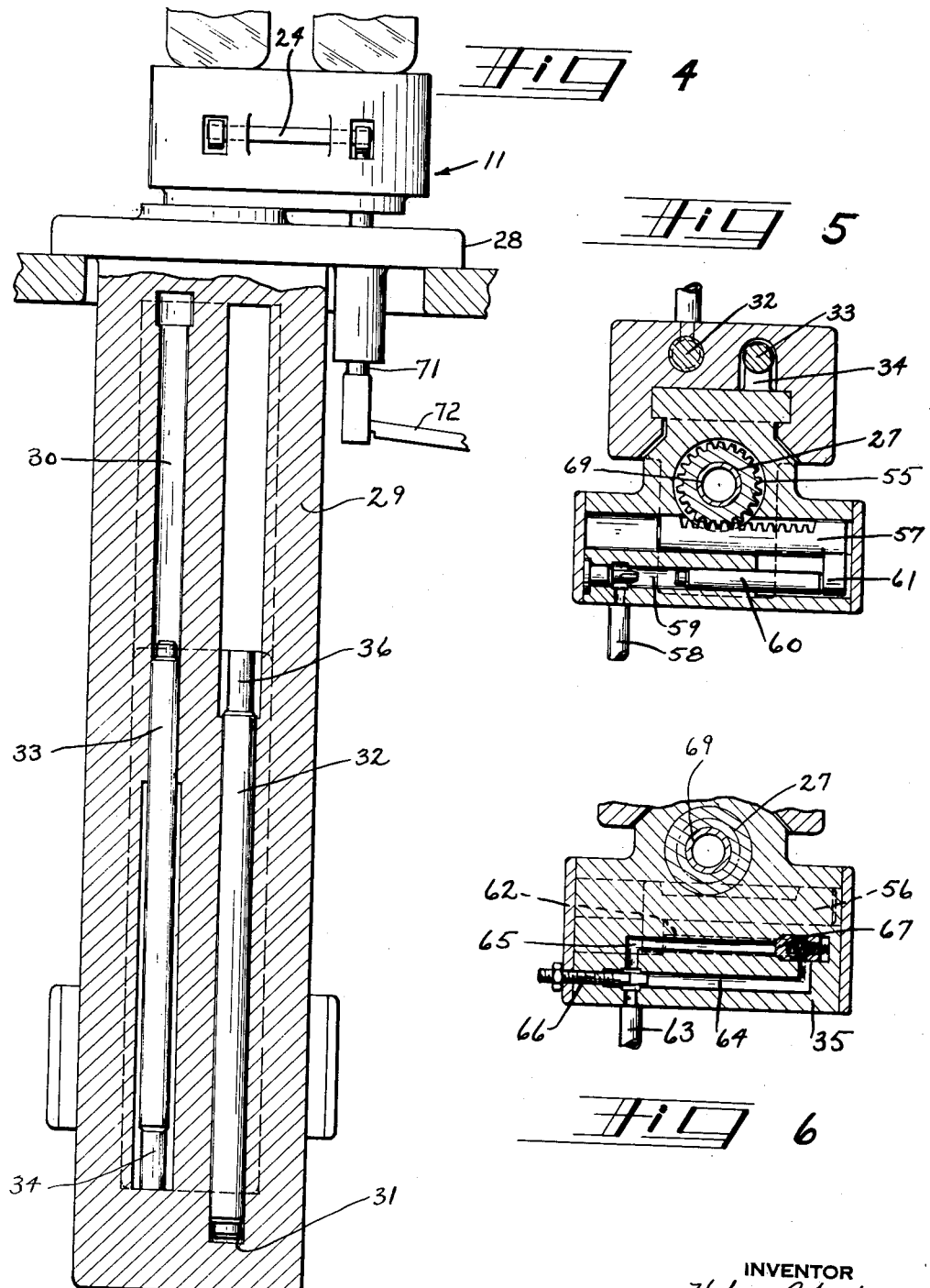
INVENTOR
Urban P. Trudeau
BY
ATTORNEYS

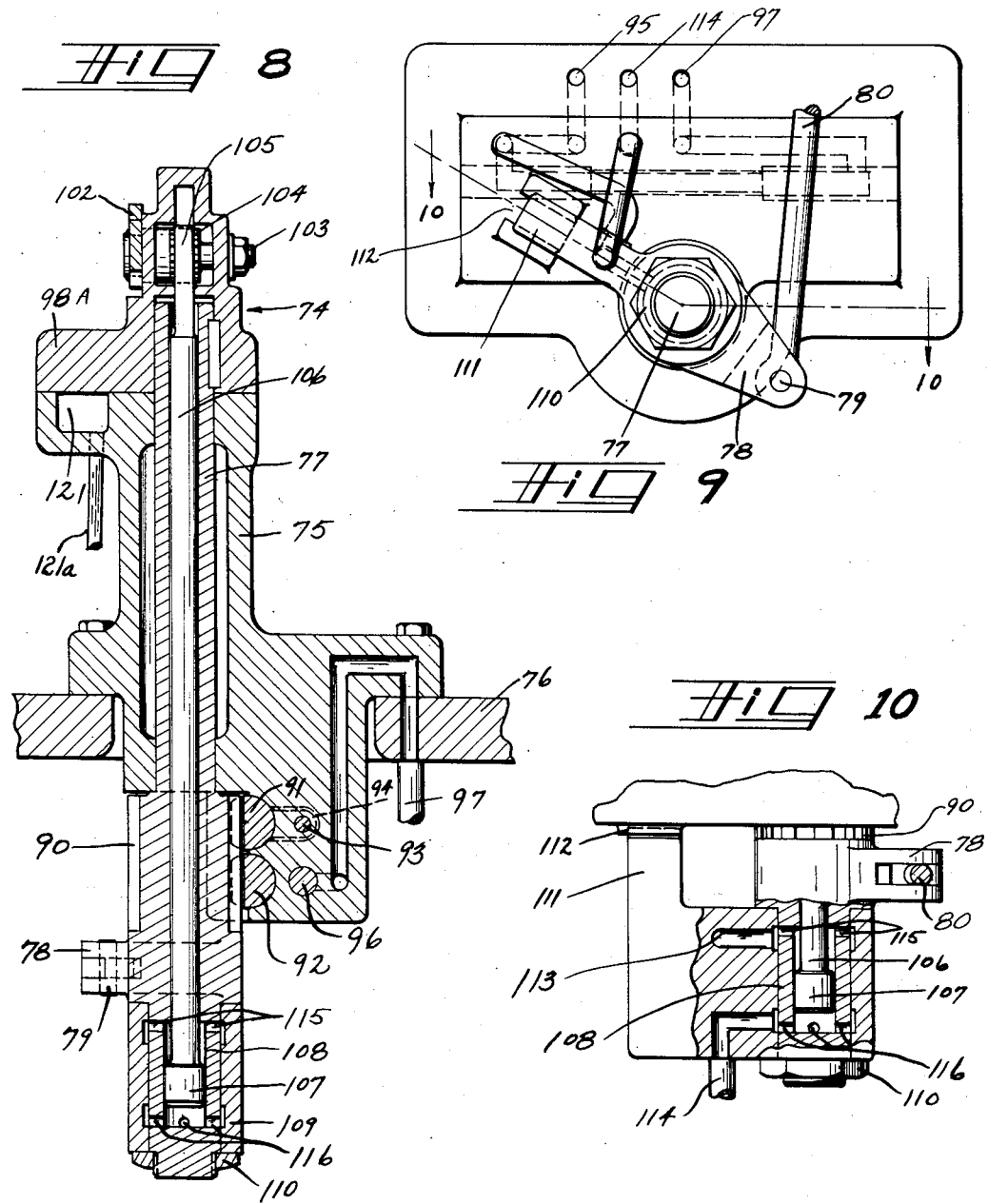

June 16, 1964 U. P. TRUDEAU 3,137,394
METHOD AND APPARATUS FOR REMOVING AND
TRANSFERRING FINISHED GLASS ARTICLES
Filed April 28, 1961 9 Sheets-Sheet 7
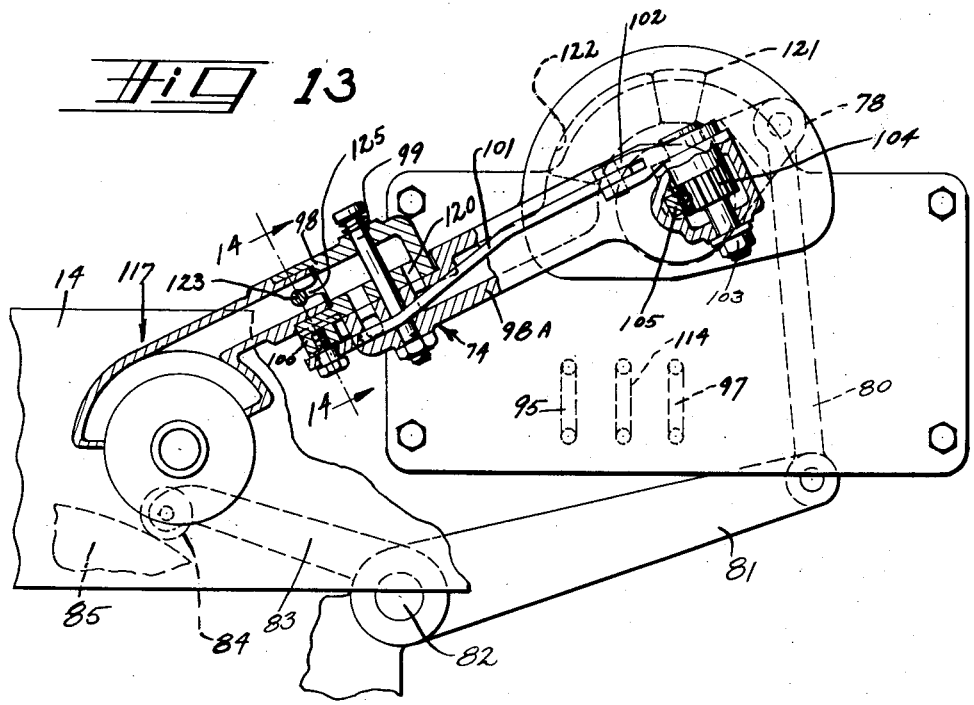
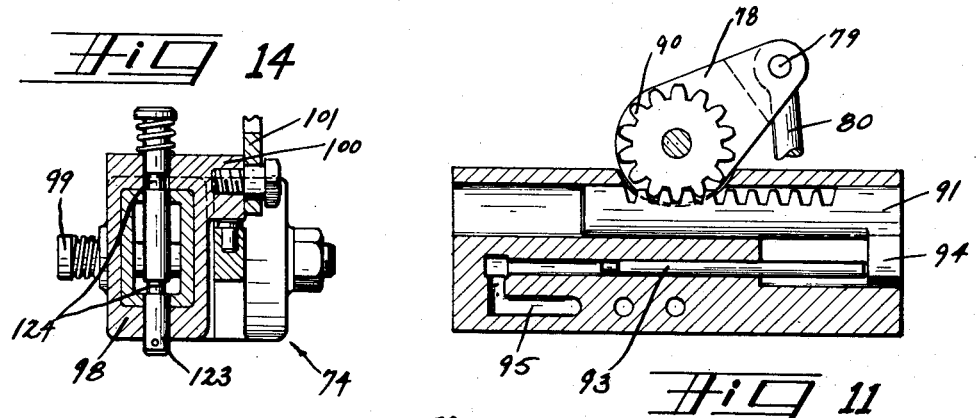
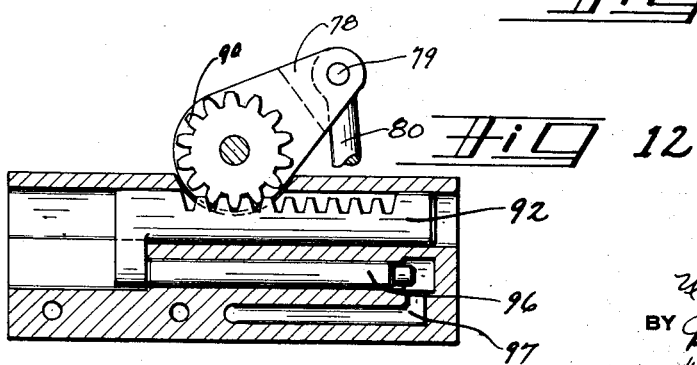
INVENTOR
Urban P. Trudeau
BY
ATTORNEYS

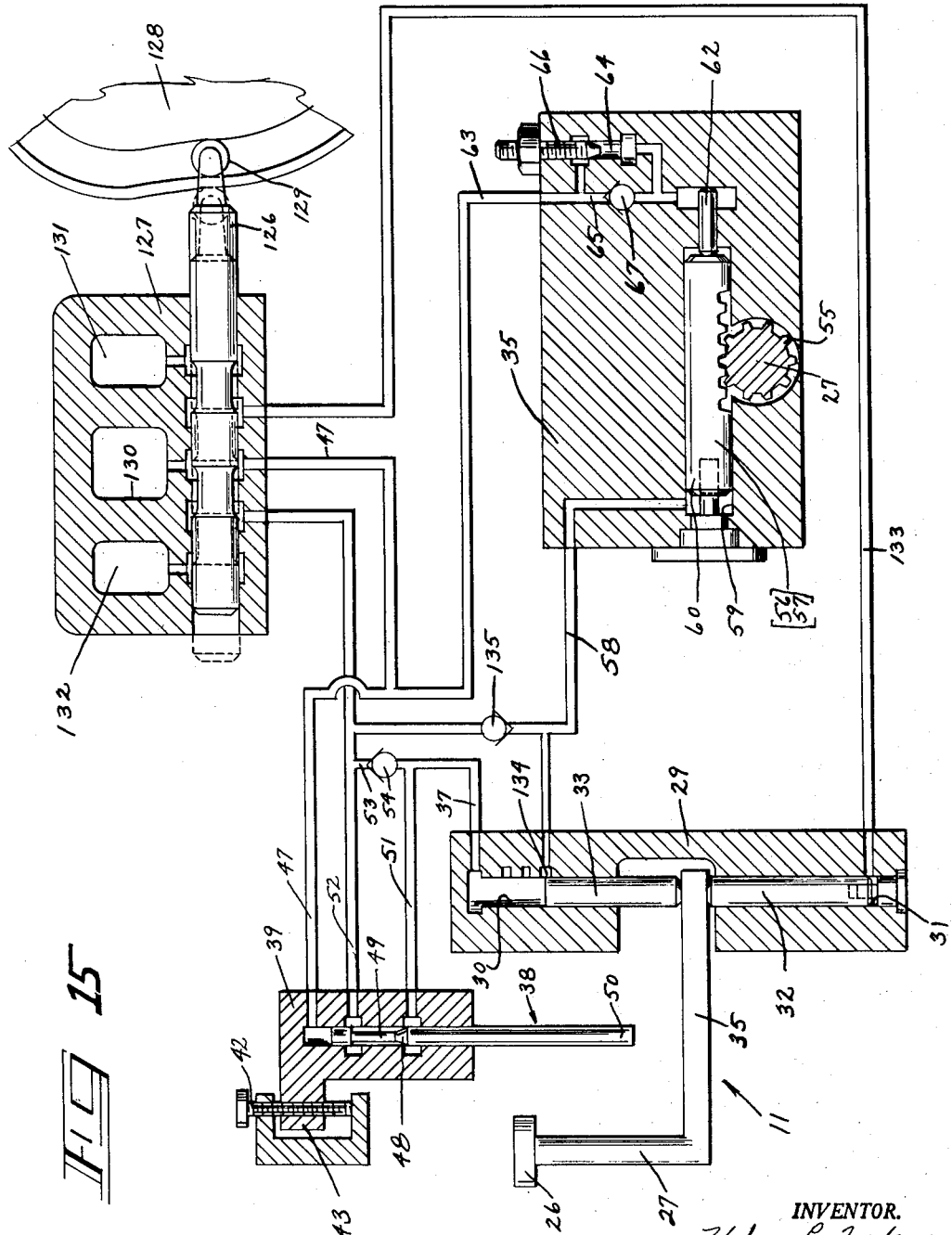

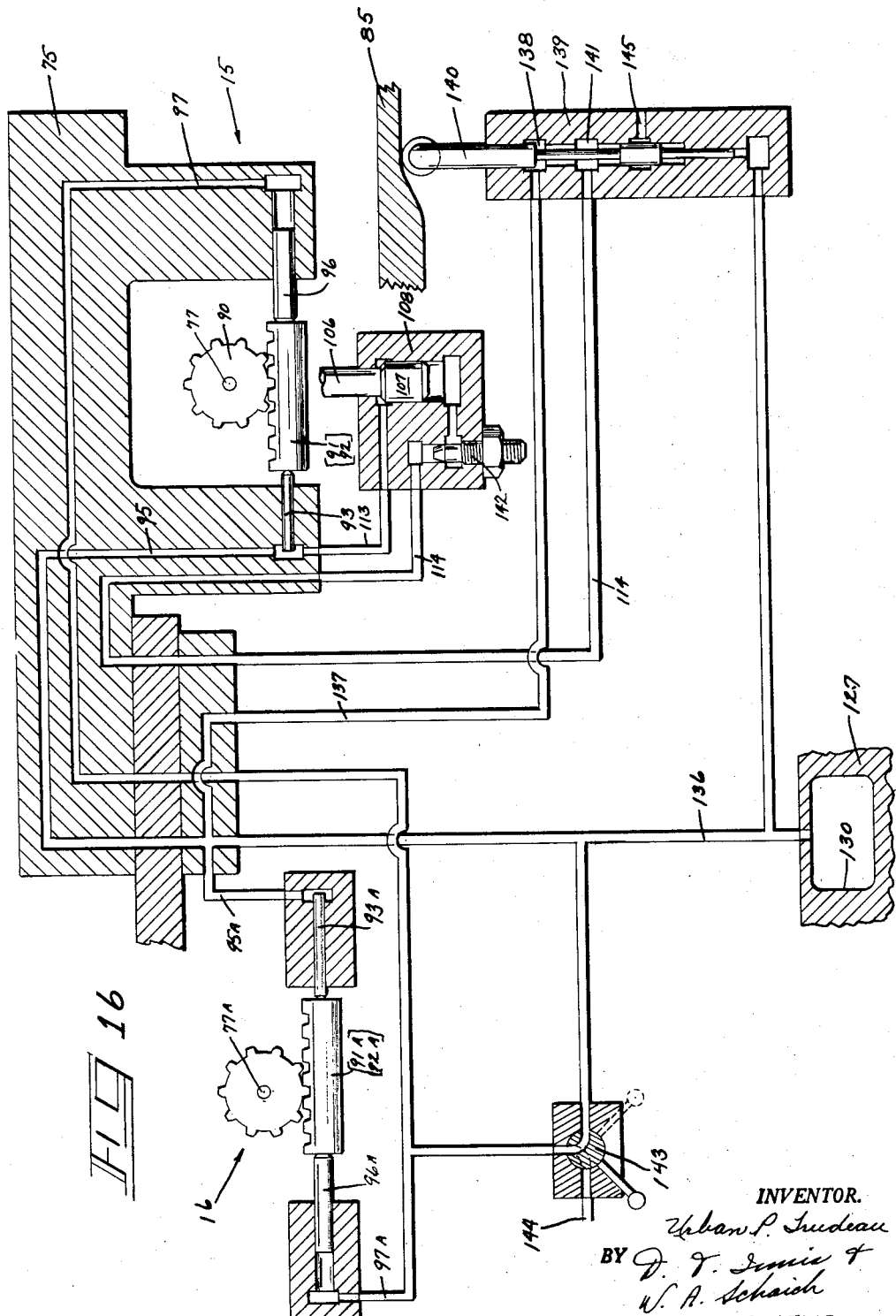

United States Patent Office 3,137,394
Patented June 16, 1964

3,137,394
METHOD AND APPARATUS FOR REMOVING AND TRANSFERRING FINISHED GLASS ARTICLES
Urban P. Trudeau, Toledo, Ohio, assignor to Owens-Illinois Glass Company, a corporation of Ohio
Filed Apr. 28, 1961, Ser. No. 106,306
2 Claims. (Cl. 214—1)

This invention relates to apparatus for removing and transferring finished glass articles from a glass forming machine to a continuously moving conveyor. More particularly, this invention provides apparatus for receiving plural glass articles released from the neck rings and for lowering and positioning glass articles in parallel relationship with respect to a continuously moving conveyor. Additionally, this apparatus will transfer the ware so positioned from its takeout position to the conveyor and deposit the ware thereon in predetermined spaced relationship.

In the operation of glass forming machines of the type in which plural glass bottles are formed by conveying the glass from a press station, then to a blow station and finally to a takeout station by neck rings which support the glass at all stations, it is necessary at the takeout station to provide mechanism for handling the bottles after the neck rings are opened to release the completed bottles. A machine of this type is shown and described in copending application Ser. No. 774,775 filed Novembed 18, 1958, now abandoned. Reference may be had to this application wherein the general arrangement of the glass forming machines is set forth and illustrated.

With this type of forming machine, it is necessary to provide mechanism for receiving the finished ware and lowering the ware a sufficient amount to clear the neck molds. Furthermore, after the ware has been lowered to clear the neck molds, it is necessary to provide mechanism for placing the ware on a conveyor so that the finished ware may be conveyed to the lehr or heat treating device.

Therefore, it is an object of this invention to provide mechanism for receiving released plural articles from a forming machine and to position these articles so that they may be transferred to a conveyor.

It is an additional object of this invention to provide apparatus for transferring the ware from the ware lowering and positioning means to a conveyor.

A further object of this invention is to provide coordinate apparatus for both lowering the released ware, positioning the lowered ware and transferring the thus positioned ware to a conveyor.

Other and further objects will be apparent from the following description taken in conjunction with the accompanying drawings wherein:

FIG. 1 is a schematic plan view of the lowering and transferring apparatus of the invention.

FIG. 2 is a schematic elevational view partly in section of the ware receiving and lowering mechanism.

FIG. 3 is a cross-sectional view taken at line 3—3 on FIG. 2.

FIG. 4 is a cross-sectional view taken at line 4—4 on FIG. 3.

FIG. 5 is a cross-sectional view taken at line 5—5 on FIG. 2.

FIG. 6 is a cross-sectional view taken at line 6—6 on FIG. 2.

FIG. 8 is a cross-sectional view taken at line 8—8 on FIG. 7.

FIG. 9 is a bottom plan view of the mechanism of FIG. 7.

FIG. 10 is a partial cross-sectional view taken at line 10—10 on FIG. 9.

FIG. 11 is a cross-sectional view taken at line 11—11 on FIG. 7.

FIG. 12 is a cross-sectional view taken at line 12—12 on FIG. 7.

FIG. 13 is a top plan view, partly in section, of the ware transfer mechanism of FIG. 7.

FIG. 14 is a cross-sectional view taken at line 14—14 on FIG. 13.

FIG. 15 is a schematic, hydraulic circuit diagram of the ware receiving and lowering mechanism, and FIG. 16 is a schematic, hydraulic circuit diagram of the mechanism of the ware transfer or sweep out mechanism.

Figure 7:
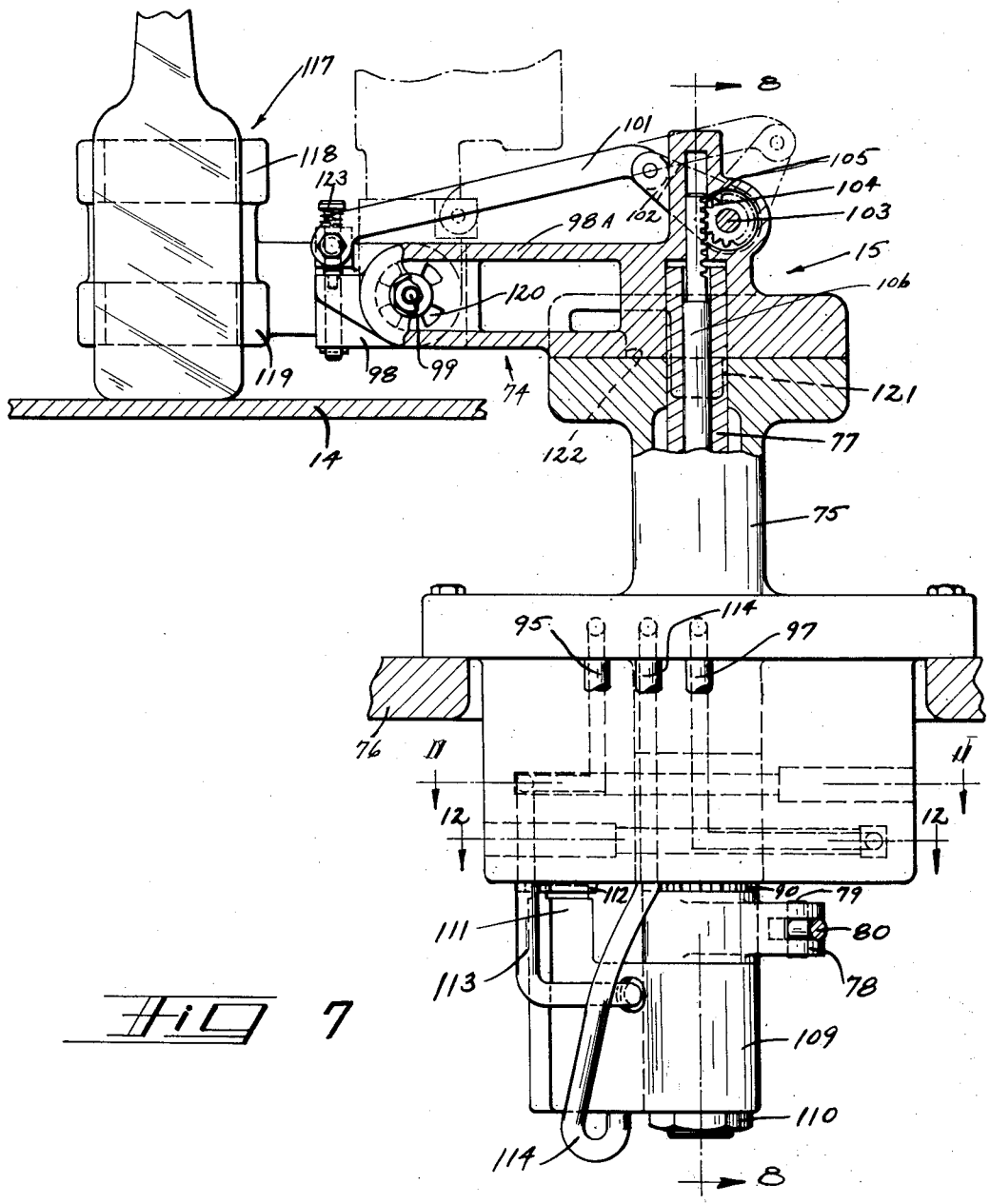
FIG. 7 is a schematic elevational view, partly in section, of the ware transfer or sweep out mechanism of the invention.

Referring to the drawings, and in particular to FIG. 1, there is shown a horizontally disposed rotatable turret 10 which carries pairs of neck molds (not shown) with the molds of each pair radially disposed with respect to each other and the axis of the turret. The turret 10 will convey completed articles to a position overlying a dead plate mechanism 11. The dead plate mechanism 11, when in the position shown by dotted line on FIG. 1, is adapted to be raised until its upper surface 12 is positioned in approximate contact with the bottom portion of a pair of blown articles 13, at which time the articles are released by the neck molds. With the articles supported on the dead plate mechanism 11, the dead plate mechanism is adapted to be lowered an amount sufficient to allow the tops of the ware 13 to clear the under surface of the neck molds from which they have been released.

After the dead plate mechanism has been lowered, it is swung about a vertical axis to the position shown in full line on FIG. 1. As thus positioned, the articles 13 have their vertical axes lying in a plane parallel to the direction of movement of a conveyor 14. When the articles 13 are positioned in this parallel plane, they are laterally transferred by sweep out mechanisms, generally designated 15 and 16, the details of which will be described below.

The sweep out mechanisms 15 and 16 operate to position the articles 13 on the conveyor 14 in a predetermined spaced relationship.

Referring now to FIGS. 2 through 6, there is shown the details of the article support members or dead plate mechanism 11. The dead plate mechanism 11 is provided with a pair of generally dish-shaped cavities 17, formed in the upper surface thereof, which conform to the bottom external surface or heel of the articles being handled. Positioned within the cavities and centrally located thereof are a pair of ware support elements 18 and 19 which have convex upper surfaces, which conform to the normally concave bottom surfaces of the blown articles 13. The ware support elements 18 and 19 are mounted for vertical movement within cavities 20 and 21 provided in the upper portion of the dead plate mechanism 11. Each ware support element has a longitudinal slot 22 formed in the bottom surface thereof within which crank arms 23 are adapted to ride. The crank arms 23 are pivotally supported by a shaft 24 which joins the two crank arms 23 so that they will operate in unison.

Extending vertically downward in coaxial alignment with the ware support element 19, is a pin 25. The pin 25 is adapted to be actuated from below for pivoting the crank arms 23 and shaft 24 to affect the raising and lowering of the ware support elements 18 and 19 relative to the top surface 12 of the dead plate mechanism 11.

The upper part 26 of the dead plate mechanism 11 is mounted on a hollow vertical shaft 27. The vertical shaft 27 is supported by a generally horizontal plate fixed support member 28 which is provided with an axial opening for receiving the vertical shaft 27.

The fixed plate 28 has an elongated downwardly extending portion 29 within which is provided a pair of cylindrical passages which form cylinders 30 and 31 within which a pair of pistons 32 and 33 are adapted to reciprocate. The piston 33 has its lower end in abutting relationship with respect to a flange 34 formed on a casting 35 which is fixed to the lower end of the hollow vertical shaft 27. The casting 35 is provided with a second flange 36 against which the upper end of piston 32 is adapted to abut. Thus it can be seen that upon the introduction of fluid under pressure to the cylinder 30, the piston 33 will move downwardly resulting in lowering the casting 35 and dead plate 11 to the position shown in FIGS. 3 and 4.

This fluid under pressure is introduced to the cylinder 30 through an inlet conduit 37. In the same manner, the introduction of fluid under pressure to the cylinder 31, formed in the downwardly extending portion 29, will cause the piston 32 to move upwardly resulting in raising the second flange 36, the casting 35, and the vertical shaft 27. In this manner, the upper part 26 of the dead plate mechanism 11 is vertically reciprocated. In order to provide a control on the height which the upper part 26 will assume during each cycle of the dead plate mechanism, an adjustable throttle valve 38 is provided. The throttle valve 38 is mounted for vertical movement in a valve block 39. The valve block 39 has an elongated groove 40 in one side thereof within which a cooperating elongated tongue 41 is adapted to slide. The tongue 41 is formed on the fixed portion 29 of the plate 28 and serves to guide the block 39 as it is adjusted vertically. The vertical adjustment of the block 39 is accomplished through the rotation of a machine screw 42 which extends through a threaded opening provided in a horizontal flange portion 43 of the block 39. The machine screw 42 has a worm gear 44 connected thereto at its lower end. The worm gear 44 is mounted to rotate between a pair of flanges 45. A crank driven worm 46 engages the worm gear 44 and through rotation of the worm, the machine screw 42 may be rotated to effect the vertical positioning of the valve block 39. The valve 38 is normally retained in its lowest position, as shown in FIGS. 2 and 3, by the application of constant pressure fluid through the conduit 47. The valve 38 has a tapered portion 48 and reduced portion 49. The lower end of valve 38 is provided with a stub shaft 50 which extends out through the lower part of the block 39.

When the casting 35 is raised by the piston 32, its upper surface will contact the stub shaft 50 and result in moving the valve 38 upward. Upward movement of valve 38 will cause the tapered portion 48 thereof to throttle the flow of oil from the cylinder 30, which oil is flowing in a passage 51 in the valve block 39. When the tapered portion 48 of the valve 38 is moved far enough, the passage 51 is completely shut off and oil will be trapped within the cylinder 30 and will prevent further vertical movement of the dead plate mechanism. Thus it can be seen that the vertical position of the valve block 39 with respect to the casting 35 determines the amplitude of the vertical movement of the dead plate mechanism. By adjusting the height of the valve block 39 in the manner previously described, this amplitude of movement may be adjusted in order to accommodate articles of various heights.

During the downward movement of the dead plate mechanism, oil under pressure is fed to the cylinder 30 through a conduit 52 connected to the valve block 39.

With the conduit 52 connected to fluid under pressure, the fluid may flow past the reduced portion 39 of the valve 38 but will primarily flow through a branch passage 53 to the passage 51, by unseating a check valve 54. Thus the valve 38 will be bypassed. However, on the return cycle when the conduit 52 is connected to an exhaust port, the check valve will seat itself in the branch passage 53 and all the oil flowing from the cylinder 30 will be required to flow through the block 39 and be controlled by the valve 38.

As previously described, the dead plate mechanism is adapted to rotate about the axis of one of the ware support elements. This rotation is accomplished by providing radial gear segments 55 in the lower end of the vertical shaft 27 and providing a pair of racks 56 and 57 having gear teeth formed thereon for engagement with the radial gear segments 55. The rack 57, which is shown in detail in FIG. 5, is moved to the position shown by the introduction of oil under pressure through a conduit 58 opening into a chamber 59 within which a piston 60 is adapted to slide. The piston 60 has one end abutting a flange 61 formed on one end of the rack 57. As shown in FIG. 5, the piston 60 has moved to the right and forced the rack 57 to the right. With the rack 57 in this position, the shaft 27 will have been rotated in a counterclockwise direction to swing the ware support element 19 about the axis of the element 18 to the position shown in FIGS. 2 and 4.

The rack 56 cooperates with shaft 27 in the same manner as rack 57 but in a reverse sense and serves to rotate the shaft 27 in a clockwise direction. The rack 56 is moved by a piston 62. Oil from a source of constant pressure is fed through a pipe 63 (FIG. 6) to the casting 35 where it will flow through a pair of parallel passages 64 and 65. The flow through passageway 64 is controlled by a throttle valve 66 and a check valve 67 is provided in the other passageway 65. The check valve 67 allows oil under pressure to flow from the passageway 65 to the chamber within which piston 62 slides. The cross-section area of piston 62 is substantially less than that of piston 60. When oil under pressure operates piston 60 to effect rotation of shaft 27, the piston 62 will act as a biasing spring and retard the rotating of shaft 27. Oil which is trapped in back of piston 62 will be forced out through passage 64, valve 66, and pipe 63. The check valve 67 prevents oil from entering passage 65. The setting of the throttle valve 66 will thus determine the rate of rotation of shaft 27. When the conduit 58 is connected to exhaust, the constant pressure being fed through pipe 63 will force the piston 62 to the left, when viewing FIG. 2, and result in moving the rack 56 to the left, and also rotate the shaft 27 clockwise.

In order to cool the bottom of the ware or articles as they are being removed from the forming machine, a source of air under pressure is fed to a manifold 68 formed in the lowermost portion of the fixed support member 28. The manifold 68 has a vertically extending tubular portion 69 which is telescopically received within the shaft 27. The tubular portion 69 extends within the shaft 27 an amount sufficient to insure that communication between the interior of the tubular portion 69 is maintained with the interior of the shaft 27 during vertical reciprocation of the shaft 27.

The upper part 26 of the dead plate mechanism 11 is formed with a central chamber 70 which communicates with the interior of the shaft 27. The chamber 70 is located between the cavities 20 and 21 and is provided with ports which open thereinto. The ware support elements 18 and 19, when in their lowered position, will allow the cooling air within the chamber 70 to enter the cavities 20 and 21.

The air will escape out through the dish-shaped cavities 17 in surrounding relationship with respect to the bottom or lower shoulder portions of the articles. In this manner, the articles are cooled while they are being lowered from the machine. When the ware support elements 18 and 19 are raised to the position shown in FIG. 2, they will seal off the chamber 70 thus effectively stopping the flow of air out through the dish-shaped cavities 17 thus constituting valves controlling flow of cooling air to the cavities. The ware support elements 18 and 19 are raised by the action of a spring biased rod 71

(FIG. 2) which comes in contact with the pin 25 when the dead plate mechanism 11 is in its lower position. The spring biased rod 71 is normally retained out of contact with the pin 25 by means of a pivoted lever 72 which extends into an opening formed in the lower portion of the rod 71 and holds the rod down.

The opposite end of the lever 72 rides on the top surface of a horizontally rotating cam 73. The lever is normally retained in the position shown in dotted lines on FIG. 2. Just prior to the time that the sweep out arms are to engage the ware 13, the cam 73 will have rotated to the position shown in FIG. 2 so as to permit the rod 71, under the action of its spring, to contact the pin 25 and raise the ware support elements 18 and 19. This positions the ware 13 in an elevated position so that the sweep out arms can easily sweep the ware 13 from the dead plate mechanism.

Referring now to FIGS. 7 to 14 there is shown the details of the apparatus for operating sweep out arm mechanism 15. The sweep out mechanism 15 generally takes the form of a horizontal arm 74 which is adapted to be oscillated about the vertical axis of a hollow support member 75. The member 75 is mounted on a stationary part 76 of the forming machine mechanism. A tubular member 77 extends up through and is supported by the hollow member 75. The tubular member 77, at its upper end, is fixed within a recess formed in the hollow horizontal arm 74. Adjacent the lower end of the member 77, there is formed a horizontally extending bifurcated crank portion 78. The bifurcated crank portion 78 is connected to one end of a horizontally disposed connecting link 80 by means of a vertical pin 79 extending through an "eye" formed in the end of the link 80. The link 80, at its opposite end, is pivotally connected to one end of an arm 81. The arm 81 is mounted for pivotal movement about a stationary bearing pin 82 and has an integral arm 83 which extends on the opposite side of the bearing pin 82. The arm 83 at its outer end carries a roller 84 which is adapted to bear against the surface of a cam 85. The cam 85 has a gear rotated at a constant speed by a constant speed motor (not shown) connected to a drive shaft 86. The shaft 86 carries a worm 87 in mesh with a gear 88. The gear 88 is connected to the shaft which supports the cam 85. Thus it can be seen that rotation of the shaft 86 at a constant speed will result in a rotation of the cam 85 at a reduced but also constant speed. The outer surface of the cam 85 is contoured in such a manner that the roller 84 will be displaced from the position shown in full line in FIG. 1 to the position shown in phantom line thereon. This movement of the roller 84 will result in reciprocation of the horizontal arm 74, resulting in sweeping out the ware 13 and returning the arm to a position preparatory to the next sweep out.

As can readily be seen when viewing FIG. 1, similar linkage mechanism is provided for operating the sweep out mechanism 16. However, it should be pointed out that the mechanism 16 is under the control of a second cam 89 which is driven in synchronism with the cam 85. Furthermore, the cam 73, previously mentioned, is carried by and rotated with the sweep out mechanism 16, thus providing a coordination between the movement of the sweep out arms and the lifting of the ware support members 18 and 19.

Returning now to the details of the sweep out mechanism 15, it can be seen that in response to the cam 85, the tubular member 77 will be rotated and result in rotating the arm 74. The tubular member 77, intermediate its ends, is provided with a pinion gear portion 90. A pair of horizontally disposed racks 91 and 92 are in mesh with the pinion gear 90. The rack 91 is adapted to slide in a horizontal opening provided in the hollow member 75 (see FIG. 11). A piston 93 bears against a laterally extending portion 94 of the rack 91.

Fluid under constant pressure is fed through a passageway 95 to the piston 93, forcing the piston 93 to the right. Therefore, the rack 91 is biased to the right as viewed in FIG. 11. This bias force would normally tend to rotate the tubular member 77 in a counterclockwise direction, however, the tubular member 77 is prevented from rotating in this direction by the roller 84 riding on the cam 85.

Thus it can be seen that the piston 93 under constant pressure acts as a constant force biasing spring to maintain the roller 84 in contact with the cam 85. The second rack 92 similarly has a piston 96 (see FIG. 12) abutting a laterally extending end portion thereof in such a manner as to tend to rotate the tubular member 77 in a clockwise direction. Fluid under pressure is fed to the piston 96 through a passageway 97. However, the fluid under pressure is fed through a passageway 97 only during a period when the sweep out mechanism 15 is to be placed out of operation.

As can be seen when viewing FIGS. 11 and 12, the piston 96 is of considerably larger cross-sectional area than the piston 93. Thus upon the application of the same pressure to both pistons 93 and 96, the result will be that piston 96 will drive the tubular member 77 in a clockwise direction and result in lifting the roller 84 from the surface of the cam 85. Under normal operations fluid under pressure is not fed to the piston 96. Thus it can be seen that the arm 74, which is attached to the member 77, will be moved from the position shown in phantom line on FIG. 1 to the position shown in full lines thereon and then returned during each cycle of the forming machine.

The dead plate mechanism 11, as previously described, is raised and lowered during each cycle of the machine and to allow for greater takeout speeds, it is necessary that the dead plate mechanism 11 be elevated prior to the return of the sweep out arm 74 to its position shown in phantom line on FIG. 1.

In order to allow this overlapping of movement between the dead plate mechanism 11 and the sweep out arm 74, it has been found advantageous to make the sweep out arm 74 of two pivotally joined members.

Referring specifically to FIGS. 7, 13 and 14, it can be seen that the arm 74 is formed of two members 98 and 98A. The member 98 extends along the side of the member 98A a short distance and the members are connected for relative pivotal movement by a horizontal shaft 99. The member 98 carries a boss 100 to which is connected a link 101. The link 101 extends back above the member 98A and has its opposite end connected to a crank arm 102. The crank arm 102 is connected to a horizontal shaft 103 which is supported in the member 98A and also carries a pinion gear 104. The pinion gear 104 meshes with a rack portion 105 formed at the upper end of a vertical shaft 106 which extends downwardly within the tubular member 77. The lower end of the shaft 106 takes the form of a piston 107 which is adapted to be hydraulically driven within a cylinder portion 108 formed in the lower end of the tubular member 77.

A sleeve 109 surrounds the cylinder 108. The sleeve 109 is held in surrounding relationship with respect to the cylinder 108 by means of a threaded nut 110 threaded on the bottom of the shaft 77. The sleeve 109 is held against rotation by means of an integral key portion 111 which extends within a keyway 112 formed on the under surface of the member 75. In this manner the sleeve 109 is held against rotation and serves as stationary manifold for connecting fluid under pressure to opposite sides of the piston portion 107 of the shaft 106. The cylinder 108 being a part of member 77 will rotate therewith, however, communication will be maintained between a pair of inlet pipes 113 and 114 connected to sleeve 109, and a plurality of radial passages 115 and 116 formed in the cylinder 108.

Alternate introduction of fluid under pressure through the pipes 113 and 114 will result in reciprocation of the piston 107 and shaft 106. Reciprocation of the shaft 106 will cause the crank arm 102 to be rotated and move the link 101 in a generally horizontal direction. Movement of the link 101 will result in pivotal movement of member 98 of the arm 74 in a clockwise direction. The member 98 has an open end within which a ware contacting member 117 is telescopically received. The member 117 is hollow and has an open ware contacting side face. The contacting face is in the form of a pair of semi-circular, annular chambers 118 and 119 having cut-out side wall portions that conform to the exterior of the ware to be handled.

By applying a vacuum to the interior of the arm 74 and the ware contacting member 117, the open faced chambers 118 and 119 will be presented to the ware to be transferred and the vacuum will hold the ware against the member 117. This vacuum is applied from a suitable source to the hollow members 98 and 98A forming the arm 74, with communication being provided between the members through a plurality of cooperating slots 120. When the arm is in the position shown in FIG. 7, the slots are lined up but when the member 98 has been moved to the position shown in phantom line on FIG. 7, the slots are out of alignment thus resulting in vacuum saving when the vacuum is not necessary. It is necessary to shut off the vacuum when the ware has been carried to and is positioned over the conveyor. The vacuum is shut off automatically by the rotation of the arm 74 to a position where its hollow interior is no longer in communication with the chamber 121 provided in the member 75, through which the vacuum is being applied.

When viewing FIG. 13, in dotted line there is shown the contour of the opening or chamber 121 formed in the upper face of the member 75. As shown in FIG. 8, the chamber 121 has a conduit 121a connected thereto which may be connected to a suitable source of vacuum. It is through this opening 121 that the vacuum is applied to the interior of the arm 74. Cooperating with this opening 121 is an opening 122, shown in dotted line on FIG. 13. When the sweep arm is in the position shown in FIG. 13, the two openings 121 and 122 have been displaced relative to each other so that they no longer are in communication. Thus the vacuum within the arm 74 is shut off. Upon movement of the arm in a clockwise direction, the openings 121 and 122 will be in communication. Since the contacting member or vacuum head 117 must conform to the external configuration of the ware being handled, it will necessarily have to be changed when different sizes and shapes of ware are being formed on the machine. With reference to FIGS. 13 and 14, a quick detach mechanism is provided for releasing the head 117 from the member 98. This mechanism takes the form of a spring biased pin 123 having a pair of axially displaced relieved portions 124. Cooperating with the pin 123 are a pair of key-hole slots 125 formed in the end of the member 117. As can readily be seen, depressing the pin 123 will place the relieved portions 124 in alignment with the slots 125 and permit the easy detachment of the head 117 from the member 98. With the pin 123 still depressed another head 117 may be telescopically inserted within the member 98 and upon release of pressure on the pin 123, the head 117 will be locked in place.

Referring specifically to FIG. 15, there is shown the hydraulic circuit diagram for the dead plate mechanism 11. The operation of the dead plate mechanism is controlled by a spool valve 126 which is slidably received within a main valve block 127. The spool valve 126 is actuated in predetermined timed sequence by the rotation of a cam 128, a portion of which is shown in contact with a roller 129 carried by the spool valve 126. Fluid under pressure is fed to a central chamber 130 within the valve block 127. Two exhaust chambers 131 and 132 are also formed within the valve block 127. Regardless of the position of the spool valve 126, fluid under constant pressure will be fed from the chamber 130 through the conduit 47 to bias the throttle valve 38 in a downward direction.

The constant pressure fluid is also fed through a pipe 63 into the chamber in back of piston 62. The pressure being fed to the piston 62 provides a constant biasing force against the racks 56 and 57, schematically shown as one rack in FIG. 15. With the valve 126 positioned as shown in FIG. 15, fluid under pressure from the chamber 130 will flow through the conduits 52 and 53 past the ball check 54 into conduit 37 which opens into the chamber 30 above the piston 33. The introduction of fluid in chamber 30 above the piston 33 will force the piston downwardly resulting in a lowering of the dead plate mechanism 11. At the same time that the piston 33 is moving downwardly, the piston 32 will move downwardly within the cylindrical opening 31. The opening 31 is connected by means of a conduit 133 to the valve block 127. With the valve 126 positioned as shown in FIG. 15 the conduit 133 will be connected to the exhaust chamber 131. After the piston 33 has moved downward to its fullest extent, a port 134 formed in the side wall of the chamber 30 will be uncovered and the fluid under pressure will pass through conduit 58 to the piston chamber 59 forcing the piston 60 to move to the right to the position shown.

This movement of the piston 60 to the right will force the racks 56 and 57 to move to the right, rotating the shaft 27 and swinging the dead plate mechanism 11 about the axis of the shaft 27. The rate at which the piston 60 and the racks 56 and 57 are moved to the right will depend upon the setting of the throttle valve 66.

As can be seen, movement of the pistons 60 and 62 to the right will cause the fluid under constant pressure to flow in a reverse direction toward the check valve 67 but the check valve will prevent flow therepast and require the trapped fluid to flow into the passage 64 and by the throttle valve 66. Therefore, the setting of the throttle valve will determine the rate at which the shaft 27 is rotated.

Continued rotation of the main cam 128 will move the spool valve 126 to the left to the position shown in dotted line. With the valve thus positioned, fluid under pressure will be fed from the pressure chamber 130 through the conduit 133 to the chamber 31, beneath the piston 32. Piston 32 will then move upward and the piston 33 also will be moved upward. As the piston 33 moves upward, it will shut off the port 134 and fluid in piston chamber 59 will pass through the check valve 135 to the conduit 52 which at this time is connected to the exhaust chamber 132. The constant pressure which is fed through conduits 47 and 63 to the piston 62 will take over and move the racks 56 and 57 to the left thus rotating the shaft 27 and positioning the dead plate mechanism 11 in the position shown in dotted line on FIG. 1.

Continued upward movement of the dead plate mechanism 11 will result in the casting 35 coming in contact with the stub shaft 50 of the throttle valve 38. Movement of the throttle valve 38 in an upward direction will cause the tapered portion 48 thereof to throttle the flow of fluid exhausting from the chamber 30. This exhausting fluid is passing through conduits 37 and 51 around the undercut portion 49 of the valve 38, and into the conduit 52 which is connected to the exhaust chamber 132. Thus it can be seen that the tapered portion 48 of the throttle valve 38 will serve to trap the exhausting fluid within the chamber 30 and thus prevent the continued upward movement of the piston 33 and the dead plate mechanism 11. This, in effect, provides an arrangement for controlling the height to which the dead plate mechanism is raised. As previously described, the valve block 39 is mounted for vertical adjustment by means of a machine screw 42 and vertical adjustment of the valve block 39 will result in controlling the highest point reached by the dead plate mechanism. This adjustment is essential when considering that the apparatus of the invention is intended to handle ware of varying lengths.

FIG. 16 illustrates the hydraulic circuitry for operating the sweep-out mechanisms 15 and 16. The sweep-out mechanisms are controlled through the operation of the cams 85 and 89, as previously described, and also are supplied by a constant pressure source of fluid through the line 136 which may be connected to the chamber 130 in the valve block 127 of FIG. 15. The constant pressure fluid introduced through line 136 is fed through lines 95 to the chamber in back of piston 93. Inasmuch as there are two sweep-out arms, this constant pressure fluid from line 136 is also fed through a line 95A to the chamber in back of a piston 93A to the sweep-out mechanism 16. The constant pressure fluid from line 95 is connected through an inlet pipe 113 to the portion of the cylinder 108 above the piston 107 on the shaft 106. A branch line 137 is also connected to the line 136 and supplies fluid under constant pressure to a first chamber 138 formed in a valve block 139. A spool valve 140 is adapted to slide axially within the valve block 139 and is actuated by the cam 85.

The valve spool 140 is maintained in contact with the cam 85 by fluid under pressure being fed to the bottom thereof from line 136. A second chamber 141 formed in the valve block 139 is connected to the pipe 114 which in turn is connected to the portion of the cylinder 108 below the piston 107. For rate control purposes, a throttle valve 142 is interposed in pipe 114. With the valve 140 positioned as shown, fluid under pressure will reach the underside of the piston 107 while the same pressure is applied to the top surface of the piston 107. However, due to the unequal areas exposed to the pressure, the piston 107 will be forced upwardly and move the shaft 106 upwardly resulting in pivoting the ware contacting member 117 into its elevated position. While only the piston 107 and shaft 106 associated with sweep out mechanism 15 is shown, it should be kept in mind that there is an identical piston and shaft associated with sweep out mechanism 16 and is operated at the same time as piston 107. At this time, the cams 85 and 89 will be in position to rotate the shafts 77 and 77A returning the sweep out arms 74 and 74A to the position shown in dotted line on FIG. 1.

At the end of its travel, the spool valve 140 will be moved downwardly thus exhausting the fluid under pressure from line 114 through an exhaust port 145 in the valve block 139. This will allow the fluid under pressure in line 113 to move the piston 107 down and move the shaft 106 down also. With the downward movement of the shaft 106, the ware contacting members 117 will be pivoted toward each other into position for the next sweep out operation.

In the event that it is necessary to keep the sweep out mechanism from operating, a hand operated valve 143 is shifted to the position shown, thus connecting the conduit 136 to the conduits 97 and 97A wherein the constant pressure fluid will be connected to the pistons 96 and 96A.

As previously described, the introduction of fluid under pressure to these pistons 96 and 96A, since they are of larger cross-section than the pistons 93 and 93A, will cause the racks 92 and 92A to rotate the shafts 77 and 77A to the extent that the rollers 84 and 84A will be disengaged from the cams 85 and 89. With the hand operated valve 143 in the position shown, the sweep out arms 74 will remain immobile.

Operation of the valve 143 to the position shown in dotted line will result in connecting the conduits 97 and 97A to an exhaust port 144 in the valve block. With the valve 143 thus positioned, the normal cycle of operation of the sweep out mechanism 15 and 16 will be carried out under the control of the cams 85 and 89.

In summary, it can be seen that applicant has provided apparatus for receiving formed articles from a forming machine and has provided mechanism for transferring the formed articles from the receiving mechanism and conveying them to a continuously moving conveyor. This mechanism is capable of high speed operation and by reason of the fact that a common drive is used for the cams 85, 89 and 128, the mechanism may operate without interference and in timed coordination.

Additionally, applicant has disclosed apparatus for transferring articles from a forming machine to a horizontal continuously moving conveyor in which the articles, as they leave the machine, are supported at the bottom thereof, lowered a predetermined amount and laterally moved about an axis of one of the articles until the axis defines a plane parallel to the direction of motion of the conveyor. After the articles are positioned in parallel with the conveyor, they are laterally moved in divergent path to a position over the conveyor and released to the conveyor in spaced relationship.

Various modifications may be resorted to within the spirit and scope of the appended claims.

I claim:

1. Apparatus for transferring pairs of glass articles from a forming machine of the indexing turret type to a conveyor, comprising a pair of article bottom support members, means for raising and lowering said support members in unison, means for rotating one of said members about the vertical axis of the other member, means responsive to the down positioning of said article support members for actuating said means for rotating said one support member about said other support member, a pair of horizontally extending arms, ware engaging surfaces on said arms, means mounting said arms for pivotal movement about vertical axes with the paths of travel of said arms extending over the down position of said support members, a pair of eccentric cams, means for rotating said cams at a constant speed, a pair of pivotally mounted cam followers, means connecting the ends of said cam followers to said arms whereby said arms are moved in response to the changing contour of said cams to effect the lateral movement of said articles, said arms having article contacting faces which conform to the contour of a portion of the sidewall of said articles, said arms being open within the contacting faces thereof, a vacuum chamber formed in the arm support, an opening formed in the top surface of the arm support, a cooperating opening formed in the lower surface of said arm in communication with the opening in said support, said openings being in register in all positions of said arms except when said arms are positioned over the conveyor, whereby said articles will be held against said faces during the movement of said arms for transferring the articles to a conveyor and releasing said vacuum when said articles are located over the conveyor.

2. Apparatus for cooling and transferring pairs of glass articles from a forming machine of the indexing turret type to a moving conveyor comprising an article support member, said member having a pair of upwardly opening cavities formed therein with the upper edges of the cavities being contoured to the outer shape of the lower portion of the articles to be handled, an article bottom supporting element mounted within each cavity for limited vertical reciprocation with respect thereto, means connected to one of said bottom supporting elements for controlling the vertical reciprocation thereof, means interconnecting said bottom supporting elements for vertical reciprocation in unison, said article supporting member being positioned with its cavities in underlying relationship with respect to articles carried by the turret of said forming machine, means connected to said member for raising said member into article receiving position, means responsive to upward movement of said member for stopping said member at a preselected height, means contacting said member for lowering said member and the articles while supported thereon, means connecting a source of cooling air to the cavities for cooling the lower portions of articles positioned thereon, valve means in said cavities, means normally holding said valve means open while said member is in elevated position and while said member is being lowered, means for closing said valve when said member is in its lowermost position, means connected to said supporting member for pivoting said members about a vertical axis coincident wtih the axis of one of said cavities to position the articles carried thereby in parallel relationship with respect to the moving conveyor, means interconnecting said means for pivoting said member and said means for lowering said member for actuating said pivoting means only after said member has been lowered, whereby said articles are cooled during the entire period that they are being lowered from the forming machine and oriented parallel to the conveyor.

References Cited in the file of this patent

UNITED STATES PATENTS

| | | |
|---|---|---|
| 2,112,119 | Rowe | Mar. 22, 1938 |
| 2,224,975 | McNamara | Dec. 17, 1940 |
| 2,253,155 | Wadman | Aug. 19, 1941 |
| 2,660,831 | Rowe | Dec. 1, 1953 |
| 2,833,088 | Olson | May 6, 1958 |